United States Patent
Benway et al.

(10) Patent No.: US 9,966,056 B2
(45) Date of Patent: May 8, 2018

(54) BIOMETRICS-BASED DYNAMIC SOUND MASKING

(71) Applicant: Plantronics, Inc., Santa Cruz, CA (US)

(72) Inventors: Evan Harris Benway, Santa Cruz, CA (US); Jacob T Meyberg, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 0 days. days.

(21) Appl. No.: 14/833,386

(22) Filed: Aug. 24, 2015

(65) Prior Publication Data

US 2017/0061950 A1     Mar. 2, 2017

(51) Int. Cl.
  *G10K 11/175* (2006.01)
  *H04R 1/10* (2006.01)
  *G06K 9/00* (2006.01)

(52) U.S. Cl.
  CPC ........ *G10K 11/175* (2013.01); *G06K 9/00892* (2013.01); *H04R 1/10* (2013.01)

(58) Field of Classification Search
  None
  See application file for complete search history.

(56) References Cited

U.S. PATENT DOCUMENTS

| | | | |
|---|---|---|---|
| 5,649,061 A | 7/1997 | Smyth | |
| 7,120,880 B1 | 10/2006 | Dryer et al. | |
| 7,547,279 B2 | 6/2009 | Kim et al. | |
| 7,813,840 B2 | 10/2010 | Suyama et al. | |
| 2003/0107478 A1 | 6/2003 | Hendricks et al. | |
| 2005/0200476 A1 | 9/2005 | Forr et al. | |
| 2007/0113725 A1* | 5/2007 | Oliver | A61B 5/02438 84/612 |
| 2007/0121824 A1 | 5/2007 | Agapi et al. | |
| 2007/0165812 A1 | 7/2007 | Lee et al. | |
| 2008/0167878 A1 | 7/2008 | Hause et al. | |
| 2011/0201960 A1 | 8/2011 | Price et al. | |
| 2012/0013750 A1* | 1/2012 | Heise | H04R 5/027 348/207.1 |
| 2013/0019187 A1 | 1/2013 | Hind et al. | |
| 2014/0064526 A1 | 3/2014 | Otto et al. | |
| 2014/0119564 A1* | 5/2014 | Caskey | G06F 17/30764 381/86 |
| 2014/0277649 A1* | 9/2014 | Chong | G06F 17/30752 700/94 |
| 2015/0081066 A1* | 3/2015 | Yeh | A61B 5/4815 700/94 |

(Continued)

FOREIGN PATENT DOCUMENTS

WO    WO 2015/061347 A1    4/2015

OTHER PUBLICATIONS

Benway, et al., U.S. Appl. No. 14/851,774, filed Sep. 11, 2015, filed Sep. 11, 2015 "Steerable Loudspeaker System for Individualized Sound Masking.".

*Primary Examiner* — Paul Huber
(74) *Attorney, Agent, or Firm* — Dienwiebel Transatlantic IP

(57) ABSTRACT

Apparatus having corresponding methods and computer-readable media comprises: a speaker configured to provide a masking sound to an individual; a biometric sensor configured to collect biometric data from the individual; and a controller configured to modify the masking sound based on the biometric data.

22 Claims, 6 Drawing Sheets

(56) References Cited

U.S. PATENT DOCUMENTS

| | | | |
|---|---|---|---|
| 2015/0206413 A1* | 7/2015 | Warner | G06Q 50/22 340/573.1 |
| 2015/0222989 A1* | 8/2015 | Labrosse | A61M 21/02 381/71.1 |
| 2015/0287421 A1 | 10/2015 | Benway et al. | |
| 2016/0234595 A1 | 8/2016 | Goran et al. | |
| 2017/0053068 A1* | 2/2017 | Pillai | G06Q 50/10 |

\* cited by examiner

BIOMETRICS-BASED DYNAMIC SOUND MASKING

FIELD

The present disclosure relates generally to the field of audio processing. More particularly, the present disclosure relates to sound masking.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

As real estate utilization increases and offices become more densely packed, speech noise is becoming an increasingly challenging problem. Overheard intelligible speech decreases productivity, speech privacy, and comfort.

Sound masking—the introduction of constant background noise in order to reduce speech intelligibility, increase speech privacy, and increase acoustical comfort—is increasingly being incorporated into offices as a solution. Sound masking generally relies on broadband sound such as filtered pink noise played by speakers that may be located for example in the ceiling plenum.

One problem that still remains in designing an optimal sound masking system relates to setting the proper masking levels. Sound masking levels are generally set during installation and can be adjusted at a later time. Typically, the levels are set equally on all speakers, and are adjusted one time to obtain a uniform level of masking at head level. The problem with this approach is that office noise fluctuates over time and by location, and different masking levels are required for different areas. An acoustical consultant installing a sound masking system outside of normal working hours is unlikely to properly address this problem and the masking levels will therefore be sub-optimal.

Existing solutions include fairly simple masking systems that simply play a set level of masking sound, use a timer to change the levels in a predictive fashion, or use microphones in the ceiling to adapt the masking sound based on ambient noise levels. But these system fail to adapt the masking sounds to the changing needs of the users.

SUMMARY

In general, in one aspect, an embodiment features an apparatus comprising: a speaker configured to provide a masking sound to an individual; a biometric sensor configured to collect biometric data from the individual; and a controller configured to modify the masking sound based on the biometric data.

Embodiments of the apparatus may include one or more of the following features. Some embodiments comprise a headset, wherein the headset comprises the speaker. Some embodiments comprise a headset, wherein the headset comprises the biometric sensor. Some embodiments comprise a headset, wherein the headset comprises the controller. In some embodiments, the controller is further configured to modify the masking sound based on a difference between the biometric data and reference data. In some embodiments, the individual is a first individual; the biometric sensor is a first biometric sensor; the biometric data is first biometric data; the speaker is further configured to provide the masking sound to a second individual; the apparatus further comprises a second biometric sensor configured to collect second biometric data from the second individual; and the controller is further configured to modify the masking sound based on the first biometric data and the second biometric data. In some embodiments, the controller is further configured to modify the masking sound based on the first biometric data, the second biometric data, and reference data.

In general, in one aspect, an embodiment features a method comprising: providing a masking sound to an individual; collecting biometric data from the individual; and modifying the masking sound based on the biometric data.

Embodiments of the method may include one or more of the following features. Some embodiments comprise providing the masking sound to the individual through a headset. Some embodiments comprise collecting the biometric data from the individual through a headset. Some embodiments comprise modifying the masking sound, based on the biometric data, within a headset. Some embodiments comprise modifying the masking sound based on a difference between the biometric data and reference data. In some embodiments, the individual is a first individual; the biometric data is first biometric data; and the method further comprises providing the masking sound to a second individual; collecting second biometric data from the second individual; and modifying the masking sound based on the first biometric data and the second biometric data. Some embodiments comprise modifying the masking sound based on the first biometric data, the second biometric data, and reference data.

In general, in one aspect, an embodiment features computer-readable media embodying instructions executable by a computer to perform functions comprising: providing a masking sound to a speaker, wherein the speaker is configured to provide the masking sound to an individual; receiving biometric data collected from the individual; and modifying the masking sound based on the biometric data.

Embodiments of the computer-readable media may include one or more of the following features. In some embodiments, the functions further comprise modifying the masking sound based on a difference between the biometric data and reference data. In some embodiments, the individual is a first individual; the biometric data is first biometric data; the speaker is further configured to provide the masking sound to a second individual; and the functions further comprise receiving second biometric data collected from the second individual, and modifying the masking sound based on the first biometric data and the second biometric data. In some embodiments, the functions further comprise: modifying the masking sound based on the first biometric data, the second biometric data, and reference data.

The details of one or more implementations are set forth in the accompanying drawings and the description below. Other features will be apparent from the description and drawings, and from the claims.

Figure 1:
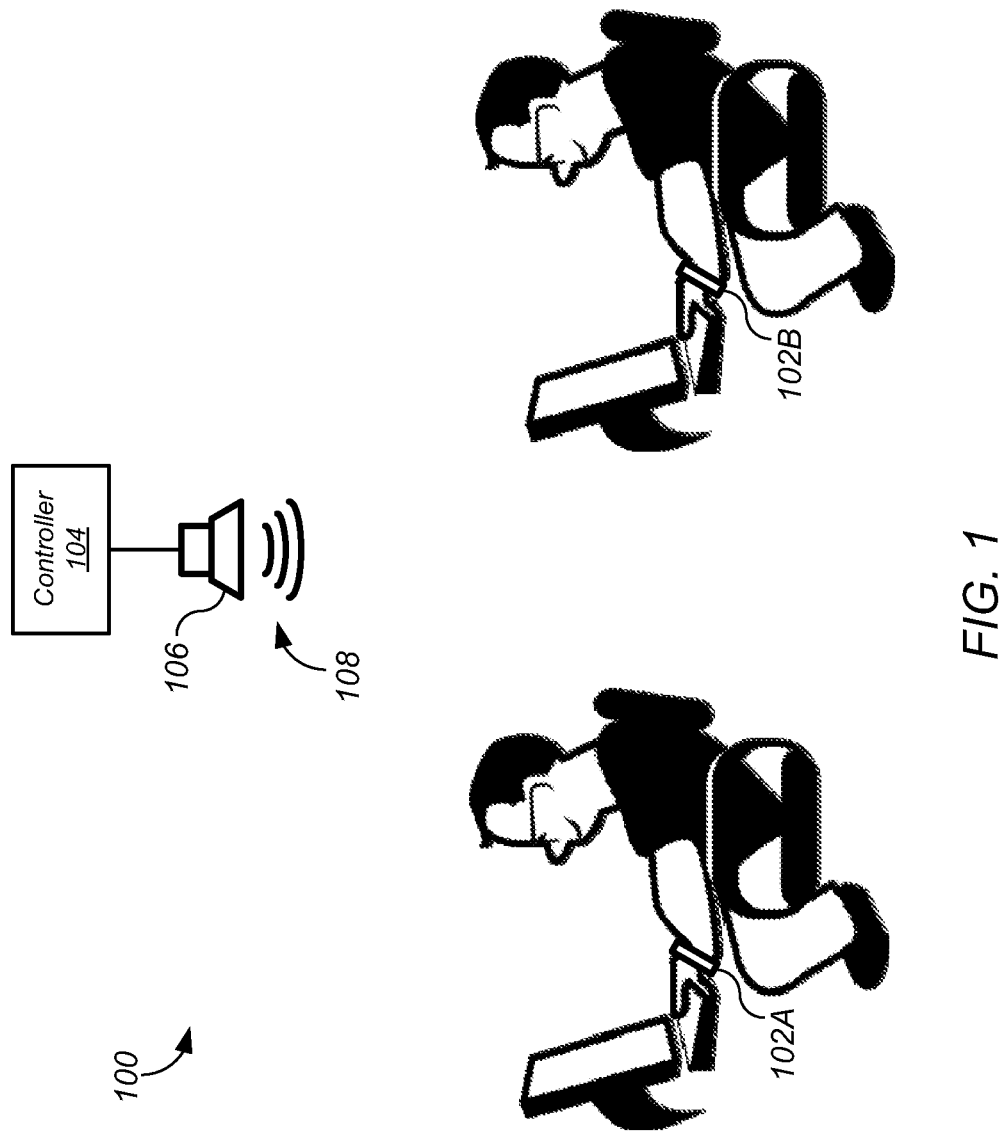
FIG. 1 shows elements of a sound masking system according to one embodiment.

The leading digit(s) of each reference numeral used in this specification indicates the number of the drawing in which the reference numeral first appears.

DETAILED DESCRIPTION

Embodiments of the present disclosure provide biometrics-based dynamic sound masking. FIG. 1 shows elements of a sound masking system 100 according to one embodiment. Although in the described embodiment elements of the sound masking system 100 are presented in one arrangement, other embodiments may feature other arrangements. For example, elements of the sound masking system 100 may be implemented in hardware, software, or combinations thereof.

Referring to FIG. 1, the sound masking system 100 may serve one individual or a group of individuals. The sound masking system 100 may include one or more wearable electronic devices 102A,B for each individual, a speaker 106 and a controller 104. The speaker 106 may provide masking sounds 108 under the control of the controller 104.

In the described embodiment the wearable electronic devices 102 are implemented as bracelets. However in other embodiments the wearable electronic devices 102 may be implemented in other forms, for example such as smart watches, headsets, pendants, brooches, garments, or the like. The bracelets 102 may include biometric sensors configured to collect biometric data from the individual(s).

In some embodiments, biometrics are collected by wearable devices. In some embodiments, some or all of the biometrics may be collected by other body-borne devices. These body-borne devices may include ingestibles, injectables, insertables, and the like, in some embodiments, some or all of the biometrics may be collected by non-body-borne devices. These non-body-borne devices may include computers, microphones, cameras, furniture, keyboards, computer mice, and the like.

Figure 2:
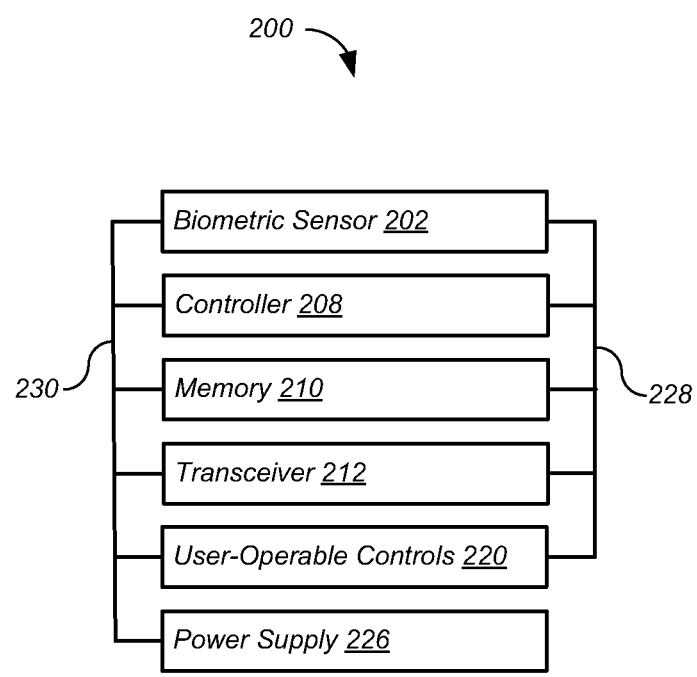
FIG. 2 shows elements of a bracelet according to one embodiment.

FIG. 2 shows elements of a bracelet 200 according to one embodiment. The bracelet 200 may be used as the bracelets 102A,B of FIG. 1. Although in the described embodiment elements of the bracelet 200 are presented in one arrangement, other embodiments may feature other arrangements. For example, elements of the bracelet 200 may be implemented in hardware, software, or combinations thereof.

Referring to FIG. 2, the bracelet 200 may include one or more of a biometric sensor 202, a transceiver 212, a controller 208, a memory 210, one or more user-operable controls 220, and a power supply 226. The bracelet 200 may include other elements as well. The elements of the bracelet 200 may receive power from the power supply 226 over one or more power rails 230. Various elements of the bracelet 200 may be implemented as one or more integrated circuits.

The controller 208 may execute applications stored in the memory 210. The controller 208 may include digital signal processors, analog-to-digital converters, digital-to-analog converters, and the like. The controller 208 may communicate with other elements of the bracelet 200 over one or more communication busses 228. The transceiver 212 may employ any communication protocol, including wired and wireless communication protocols. The wireless protocols may include Bluetooth, Bluetooth Low-Energy (BLE), Wi-Fi, Digital Enhanced Cordless Telecommunications (DECT), cellular, near-field communications (NFC), and the like. The transceiver 212 may employ multiple communication protocols. The user-operable controls 220 may include buttons, slide switches, capacitive sensors, touch screens, and the like.

Figure 3:
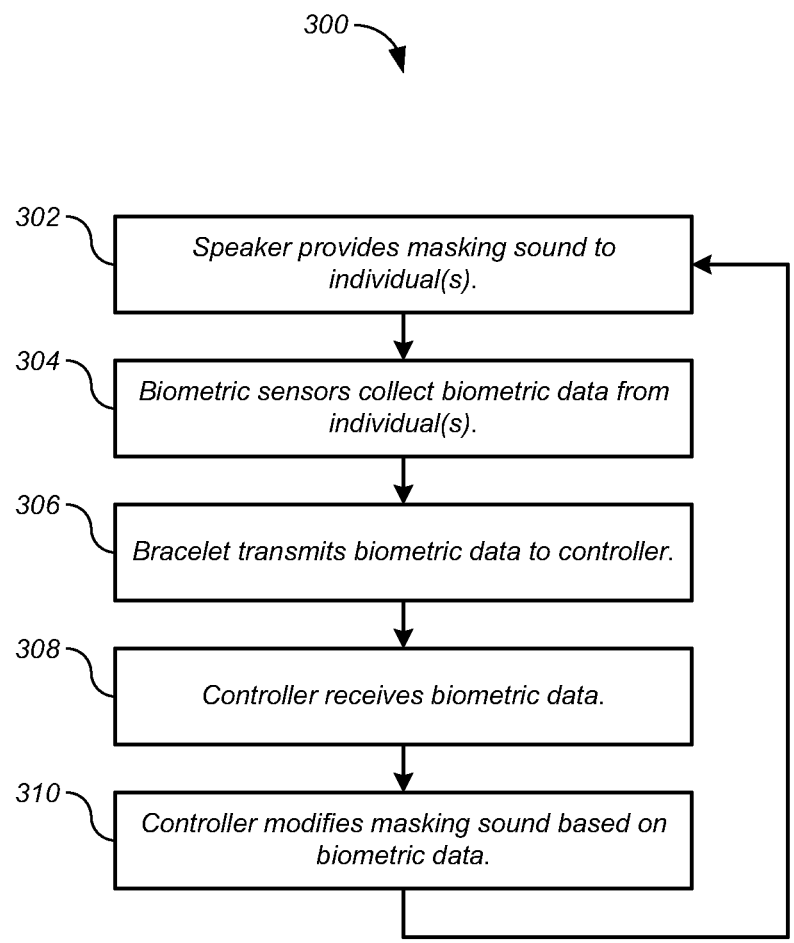
FIG. 3 shows a process for the sound masking system of FIG. 1 according to one embodiment.

FIG. 3 shows a process 300 for the sound masking system 100 of FIG. 1 according to one embodiment. Although in the described embodiments the elements of process 300 are presented in one arrangement, other embodiments may feature other arrangements. For example, in various embodiments, some or all of the elements of process 300 can be executed in a different order, concurrently, and the like. Also some elements of process 300 may not be performed, and may not be executed immediately after each other. In addition, some or all of the elements of process 300 can be performed automatically, that is, without human intervention.

Referring to FIG. 3, at 302, the speaker 106 may provide the masking sound 108 to one or more individuals. The masking sound 108 may include any masking sound. For example, the masking sound 108 may include pink noise, brown noise, filtered noise, nature sounds, music, and the like.

At 304, the biometric sensors 202 may collect biometric data from the individual(s). The biometric sensors 202 may collect any biometric data. For example, the biometric data may include direct biometrics, indirect biometrics, and the like. Direct biometrics may include measures such as heart rate, respiratory rate, brain activity, galvanic skin response, facial expressions, voice analysis (tonal, speech analytics, double talk), and the like. Indirect biometrics may include measures such as typing rate, keyboard pressure (tactile input), and the like.

At 306, the bracelet 200 may transmit the biometric data to the controller 104. That is, the transceiver 212 may transmit a signal representing the biometric data. At 308, the controller 104 may receive the biometric data.

At 310, the controller 104 may modify the masking sound 108 based on the biometric data. For example, the controller 104 may modify one or more aspects of the masking sound 108. The aspects may include frequencies, temporal aspects, amplitudes, spectral envelopes, and the like. Modification of the masking sound may also include addition or removal of components of the masking sound 108.

In embodiments involving more than one individual, the controller 104 may modify the masking sound 108 in a number of ways. The controller 104 may modify the masking sound 108 based on a combination of the biometric data collected from the individuals. For example, the combination may be an average of the biometric data across the individuals, a weighted average, or the like. The controller 104 may modify different components of the masking sound 108 for different individuals.

In some embodiments, the controller 104 may modify the masking sound 108 based on a difference between the biometric data and reference data so as to implement a closed-loop process. For example, the controller may modify the masking sound based on the difference between an individual's current heart rate and an ideal heart rate so as to minimize the difference over time.

In some embodiments, the controller 208 in the bracelet 200 may perform some or all of the functions described as performed by the controller 104. In some embodiments, some or all of the functions may be performed by another controller, which may be located remotely.

At 302, the process 300 may resume.

Figure 4:
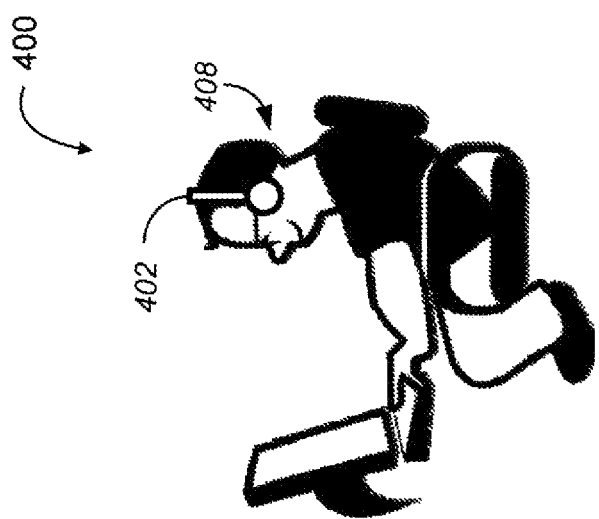
FIG. 4 shows elements of a sound masking system according to an embodiment that employs a headset.

FIG. 4 shows elements of a sound masking system 400 according to an embodiment that employs a headset. Although in the described embodiment elements of the sound masking system 400 are presented in one arrangement, other embodiments may feature other arrangements. For example, elements of the sound masking system 400 may be implemented in hardware, software, or combinations thereof.

Referring to FIG. 4, the sound masking system 400 may include a headset 402. The headset 402 is configured to provide masking sounds 408.

Figure 5:
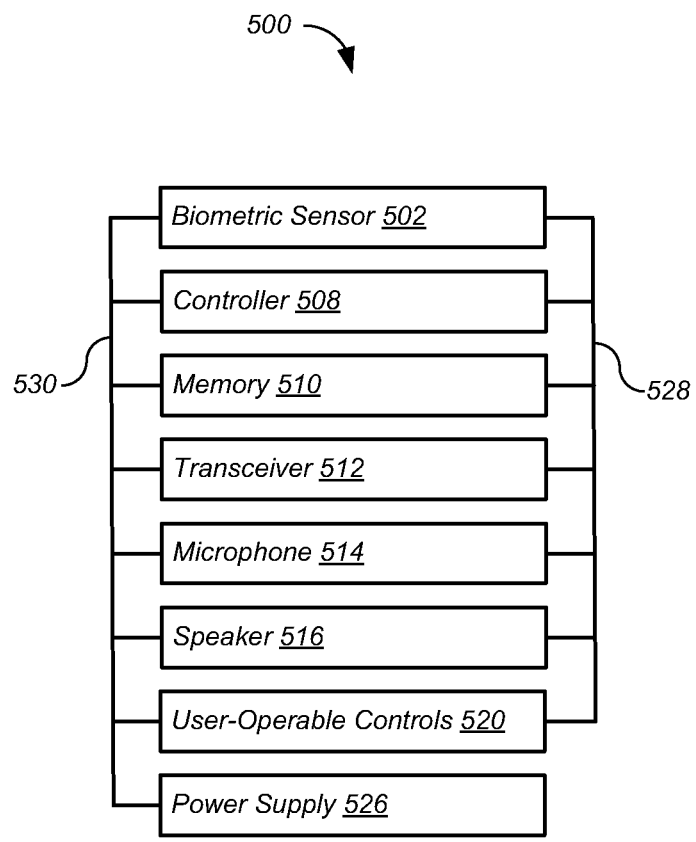
FIG. 5 shows elements of a headset according to one embodiment.

FIG. 5 shows elements of a headset 500 according to one embodiment. The headset 500 may be used as the headset 402 of FIG. 4. Although in the described embodiment elements of the headset 500 are presented in one arrangement, other embodiments may feature other arrangements. For example, elements of the headset 500 may be implemented in hardware, software, or combinations thereof.

Referring to FIG. 5, the headset 500 may include one or more of a biometric sensor 502, a transceiver 512, a controller 508, a memory 510, a microphone 514, a speaker 516, one or more user-operable controls 520, and a power supply 526. The headset 500 may include other elements as well. The elements of headset 500 may receive power from the power supply 526 over one or more power rails 530. Various elements of the headset 500 may be implemented as one or more integrated circuits.

The controller 508 may execute applications stored in the memory 510. The controller 508 may include digital signal processors, analog-to-digital converters, digital-to-analog converters, and the like. The controller 508 may communicate with other elements of the headset 500 over one or more communication busses 528. The transceiver 512 may employ any communication protocol, including wired and wireless communication protocols. The wireless protocols may include Bluetooth, Bluetooth Low-Energy (BLE), Wi-Fi, Digital Enhanced Cordless Telecommunications (DECT), cellular, near-field communications (NFC), and the like. The transceiver 512 may employ multiple communication protocols. The user-operable controls 520 may include buttons, slide switches, capacitive sensors, touch screens, and the like.

Figure 6:
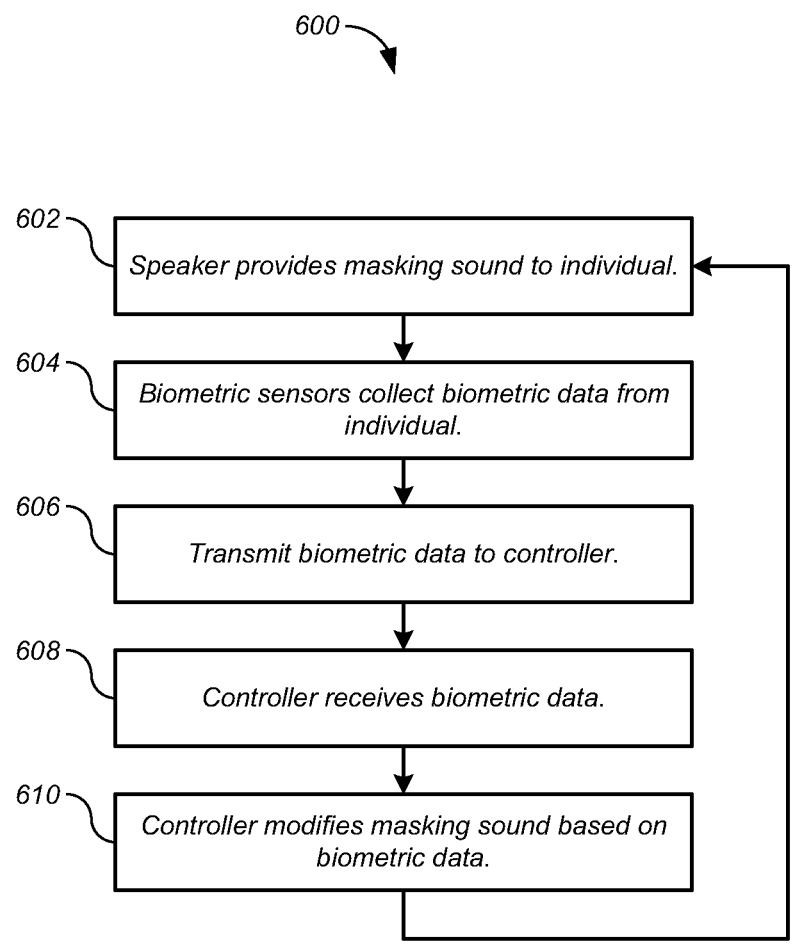
FIG. 6 shows a process for the sound masking system of FIG. 5 according to one embodiment.

FIG. 6 shows a process 600 for the sound masking system 500 of FIG. 5 according to one embodiment. Although in the described embodiments the elements of process 600 are presented in one arrangement, other embodiments may feature other arrangements. For example, in various embodiments, some or all of the elements of process 600 can be executed in a different order, concurrently, and the like. Also some elements of process 600 may not be performed, and may not be executed immediately after each other. In addition, some or all of the elements of process 600 can be performed automatically, that is, without human intervention.

Referring to FIG. 6, at 602, the speaker 516 may provide the masking sound 408 to an individual wearing the headset 500. The masking sound 408 may include any masking sound. For example, the masking sound 408 may include pink noise, brown noise, filtered noise, nature sounds, music, and the like.

At 604, the biometric sensors 502 may collect biometric data from the individual. The biometric sensors 502 may collect any biometric data. For example, the biometric data may include direct biometrics, indirect biometrics, and the like. Direct biometrics may include measures such as heart rate, respiratory rate, brain activity, galvanic skin response, facial expressions, voice analysis (tonal, speech analytics, double talk), and the like. Indirect biometrics may include measures such as typing rate, keyboard pressure (tactile input), and the like.

At 606, the headset 500 may pass the biometric data to the controller 508. That is, the transceiver 512 may transmit the biometric data over the bus 528. At 608, the controller 508 may receive the biometric data.

At 610, the controller 508 may modify the masking sound 408 based on the biometric data. For example, the controller 508 may modify one or more aspects of the masking sound 408. The aspects may include frequencies, temporal aspects, amplitudes, spectral envelopes, and the like. Modification of the masking sound may also include addition or removal of components of the masking sound 408.

In some embodiments, the controller 508 may modify the masking sound 408 based on a difference between the biometric data and reference data so as to implement a closed-loop process. For example, the controller may modify the masking sound based on the difference between the individual's current heart rate and an ideal heart rate so as to minimize the difference over time.

In some embodiments, the controller 508 in the headset 500 may perform some or all of the functions described as performed by the controller 508. In some embodiments, some or all of the functions may be performed by another controller, which may be located remotely.

At 602, the process 600 may resume.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). As used herein, the term "module" may refer to any of the above implementations.

A number of implementations have been described. Nevertheless, various modifications may be made without departing from the scope of the disclosure. Accordingly, other implementations are within the scope of the following claims.

What is claimed is:

1. A sound masking apparatus comprising:
one or more speakers configured to at least provide a masking sound to more than one individual, said masking sound comprising one or more of noise and nature sounds;
a plurality of biometric sensors configured to collect biometric data from a plurality of individuals; and
a controller configured to modify the masking sound based on a combination of the biometric data collected from the plurality of individuals, wherein
the controller is configured to modify the masking sound based on at least one of an average and a weighted average of the biometric data collected from the plurality of individuals.

2. The apparatus of claim 1, further comprising:
a plurality of headsets, wherein the headsets comprise the biometric sensors.

3. The apparatus of claim 1, further comprising:
a headset, wherein the headset comprises the controller.

4. The apparatus of claim 1, wherein:
the controller is further configured to modify the masking sound based on a difference between the biometric data and reference data.

5. The apparatus of claim 1, wherein the controller is configured to modify the masking sound by modifying one or more characteristics of the masking sound, selected from the group of characteristics of frequency, temporal characteristic, and spectral envelope.

6. The apparatus of claim 1, wherein the controller is configured to modify the masking sound by at least one of adding components to the masking sound, and removing components from the masking sound.

7. The apparatus of claim 1, wherein the one or more speakers are configured to at least provide a masking sound to multiple individuals in an office environment.

8. The apparatus of claim 1, wherein the masking sound comprises nature sounds and the controller is configured to modify the masking sound by adding components to and/or removing components from the nature sounds.

9. The apparatus of claim 8, wherein the components are nature sound components.

10. The apparatus of claim 8, wherein the masking sound does not comprise substantial noise.

11. A method of sound masking comprising:
providing at least a masking sound to more than one individual, said masking sound comprising one or more of noise and nature sounds;
collecting biometric data from a plurality of individuals; and
modifying the masking sound based on a combination of the biometric data collected from the plurality of individuals, wherein
the masking sound is modified based on at least one of an average and a weighted average of the biometric data collected from the plurality of individuals.

12. The method of claim 11, further comprising:
collecting the biometric data from the individuals through a plurality of headsets.

13. The method of claim 11, further comprising:
modifying the masking sound, based on the biometric data, within a headset.

14. The method of claim 11, further comprising:
modifying the masking sound based on a difference between the biometric data and reference data.

15. The method of claim 11, wherein the step of modifying the masking sound comprises modifying one or more characteristics of the masking sound, selected from the group of characteristics of frequency, temporal characteristic, and spectral envelope.

16. The method of claim 11, wherein the step of modifying the masking sound comprises at least one of adding components to the masking sound, and removing components from the masking sound.

17. The method of claim 11, wherein the masking sound is provided to multiple individuals in an office environment.

18. A non-transitory computer-readable media embodying instructions executable by a computer to perform sound masking functions comprising:
providing at least a masking sound to one or more speakers, wherein the speakers are configured to provide at least the masking sound to more than one individual; and wherein the masking sound comprising one or more of noise and nature sounds;
receiving biometric data collected from a plurality of individuals; and modifying the masking sound based on a combination of the biometric data collected from the plurality of individuals, wherein
the masking sound is modified based on at least one of an average and a weighted average of the biometric data collected from the plurality of individuals.

19. The computer-readable media of claim 18, wherein the functions further comprise:
modifying the masking sound based on a difference between the biometric data and reference data.

20. The computer-readable media of claim 18, wherein the step of modifying the masking sound comprises modifying one or more characteristics of the masking sound, selected from the group of characteristics of frequency, temporal characteristic, and spectral envelope.

21. The computer-readable media of claim 18, wherein the step of modifying the masking sound comprises at least one of adding components to the masking sound, and removing components from the masking sound.

22. The computer-readable media of claim 18, wherein the masking sound is provided to multiple individuals in an office environment.

* * * * *